United States Patent
Krueger et al.

(10) Patent No.: US 9,708,485 B2
(45) Date of Patent: Jul. 18, 2017

(54) AQUEOUS BINDERS FOR GRANULAR AND/OR FIBROUS SUBSTRATES

(71) Applicant: BASF SE, Ludwigshafen (DE)

(72) Inventors: Christian Krueger, Speyer (DE); Alexander Centner, Roedersheim-Gronau (DE); Oliver Labisch, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/807,512

(22) Filed: Jul. 23, 2015

(65) Prior Publication Data

US 2015/0329714 A1    Nov. 19, 2015

Related U.S. Application Data

(60) Continuation of application No. 14/160,869, filed on Jan. 22, 2014, now Pat. No. 9,127,150, which is a division of application No. 13/408,146, filed on Feb. 29, 2012, now abandoned.

(60) Provisional application No. 61/448,221, filed on Mar. 2, 2011.

(51) Int. Cl.
| | |
|---|---|
| *C08L 33/08* | (2006.01) |
| *C08L 1/00* | (2006.01) |
| *C08L 3/00* | (2006.01) |
| *C08L 25/14* | (2006.01) |

(52) U.S. Cl.
CPC .............. *C08L 33/08* (2013.01); *C08L 25/14* (2013.01); *C08L 2201/54* (2013.01); *C08L 2203/12* (2013.01)

(58) Field of Classification Search
None
See application file for complete search history.

(56) References Cited

U.S. PATENT DOCUMENTS

| | | | |
|---|---|---|---|
| 2,520,959 A | | 9/1950 | Powers |
| 3,238,173 A | | 3/1966 | Bailey et al. |
| 3,360,599 A | | 12/1967 | Nyberg et al. |
| 3,397,165 A | | 8/1968 | Goodman et al. |
| 3,726,824 A | | 4/1973 | Saunders et al. |
| 3,734,686 A | | 5/1973 | Douglas |
| 4,269,749 A | | 5/1981 | Marriott et al. |
| 4,835,212 A | * | 5/1989 | Degen ................. C08F 220/18 524/47 |
| 5,290,832 A | | 3/1994 | Schwerzel et al. |
| 5,536,779 A | * | 7/1996 | Wendel ................ C04B 24/26 524/457 |
| 6,207,756 B1 | | 3/2001 | Datta et al. |
| 8,877,842 B2 | | 11/2014 | Krueger |
| 9,023,919 B2 | | 5/2015 | Krueger |
| 9,187,671 B2 | | 11/2015 | Krueger |
| 2003/0027915 A1 | | 2/2003 | Gerst et al. |
| 2009/0170978 A1 | | 7/2009 | Kelly |
| 2010/0222463 A1 | | 9/2010 | Brady et al. |

FOREIGN PATENT DOCUMENTS

| | | |
|---|---|---|
| DE | 40 03 422 A1 | 8/1991 |
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| EP | 0 536 588 A1 | 4/1993 |

(Continued)

OTHER PUBLICATIONS

International Search Report and Written Opinion issued Apr. 27, 2012 in PCT/EP2012/053427 with English translation of Category of Cited Documents.

*Primary Examiner* — Vu A Nguyen
(74) *Attorney, Agent, or Firm* — Oblon, McClelland, Maier & Neustadt, L.L.P.

(57) ABSTRACT

The present disclosure relates to an aqueous binder composition, comprising
a) at least one polymer P constructed from
 ≥0.1 and ≤2.5 wt % of at least one acid-functional ethylenically unsaturated monomer (monomers A)
 ≥0 and ≤4.0 wt % of at least one ethylenically unsaturated carboxylic acid nitrile or dinitrile (monomers B)
 ≥0 and ≤2.0 wt % of at least one crosslinking monomer having two or more nonconjugated ethylenically unsaturated groups (monomers C)
 ≥0 and ≤10 wt % of at least one α,β-monoethylenically unsaturated $C_3$ to $C_6$ mono- or dicarboxamide (monomers D)
 ≥25 and ≤69.9 wt % of at least one ethylenically unsaturated monomer whose homopolymer has a glass transition temperature ≤30° C. and which differs from the monomers A to D (monomers E), and
 ≥30 and ≤70 wt % of at least one ethylenically unsaturated monomer whose homopolymer has a glass transition temperature ≥50° C. and which differs from the monomers A to D (monomers F),
 in polymerized form, wherein the amounts of monomers A to F sum to 100 wt %, and
b) at least one saccharide compound S, the amount of which is determined such that it is ≥10 and ≤400 parts by weight per 100 parts by weight of polymer P.

15 Claims, No Drawings

(56) References Cited

FOREIGN PATENT DOCUMENTS

| | | |
|---|---|---|
| EP | 0 649 870 A1 | 4/1995 |
| EP | 0 771 328 | 5/1997 |
| EP | 0 911 361 A1 | 4/1999 |
| EP | 1 578 879 | 9/2005 |
| WO | 95/33775 A1 | 12/1995 |
| WO | 99/09251 A1 | 2/1999 |
| WO | 2004/061038 A1 | 7/2004 |
| WO | 2008/150647 A1 | 12/2008 |

* cited by examiner

AQUEOUS BINDERS FOR GRANULAR AND/OR FIBROUS SUBSTRATES

This application is a continuation of U.S. application Ser. No. 14/160,869 filed Jan. 22, 2014, which is a divisional of U.S. application Ser. No. 13/408,146 filed Feb. 29, 2012, which is a non-provisional application of U.S. application Ser. No. 61/448,221 filed Mar. 2, 2011, the contents of all of which are incorporated herein by reference.

DESCRIPTION

The present invention relates to an aqueous binder composition comprising
a) at least one polymer P constructed from
  ≥0.1 and ≤2.5 wt % of at least one acid-functional ethylenically unsaturated monomer (monomers A)
  ≥0 and ≤4.0 wt % of at least one ethylenically unsaturated carboxylic acid nitrile or dinitrile (monomers B)
  ≥0 and ≤2.0 wt % of at least one crosslinking monomer having two or more nonconjugated ethylenically unsaturated groups (monomers C)
  ≥0 and ≤10 wt % of at least one α,β-monoethylenically unsaturated $C_3$ to $C_6$ mono- or dicarboxamide (monomers D)
  ≥25 and ≤69.9 wt % of at least one ethylenically unsaturated monomer whose homopolymer has a glass transition temperature ≤30° C. and which differs from the monomers A to D (monomers E), and
  ≥30 and ≤70 wt % of at least one ethylenically unsaturated monomer whose homopolymer has a glass transition temperature ≥50° C. and which differs from the monomers A to D (monomers F),
    in polymerized form, wherein the amounts of monomers A to F sum to 100 wt %, and
b) at least one saccharide compound S, the amount of which is determined such that it is ≥10 and ≤400 parts by weight per 100 parts by weight of polymer P.

The present invention further relates to the use of the aforementioned aqueous binder composition as binder for granular and/or fibrous substrates, processes for production of shaped articles by using the aqueous binder composition and also to the shaped articles thus obtained, more particularly bonded fiber webs which in turn are used for producing bituminized roofing membranes.

Polysaccharide-containing aqueous binder compositions must be viewed in light of the following prior art:

EP-A 649 870 discloses mixtures of polycarboxylic acids and saccharide compounds in a weight ratio ranging from 95:5 to 20:80 for production of gas barrier films.

EP-A 911 361 discloses aqueous binder systems for granular and/or fibrous substrates comprising a polycarboxy polymer having a weight average molecular weight of at least 1000 g/mol and a polysaccharide having a weight average molecular weight of at least 10 000 g/mol, the amounts of which are determined such that the equivalence ratio of carboxyl groups to hydroxyl groups is in the range from 3:1 to 1:20.

EP-A 1 578 879 discloses aqueous binder compositions for coating glass fibers, comprising a polycarboxy polymer, a polyalcohol having at least two hydroxyl groups and also a so-called water-soluble extender, wherein polysaccharides having an average molecular weight below 10 000 g/mol are proposed as water-soluble extender.

WO 2008/150647 discloses aqueous binder systems for production of fiber mats, comprising a urea-formaldehyde resin and an aqueous copolymer dispersion whose copolymer is constructed essentially of styrene, alkyl acrylates and/or methacrylates, acrylonitrile and an optionally substituted acrylamide. Optionally, the aqueous copolymer dispersion may further comprise starch.

US-A 2009/170978 discloses aqueous binder systems for fiber webs, comprising an aqueous copolymer dispersion whose copolymer comprises between 5 and 40 wt % of at least one carboxyl-containing monomer in polymerized form, and a natural binder component selected from the group comprising polysaccharides, vegetable proteins, lignins and/or lignosulfonates.

Prior art binder systems are disadvantageous in that they, in the production of shaped articles from granular and/or fibrous substrates, are not always fully satisfactory especially with regard to mechanical properties thereof.

The problem addressed by the present invention was therefore that of providing aqueous binder compositions whereby the disadvantages of prior art aqueous binder compositions can be overcome and whereby shaped articles having improved transverse breaking strength at room temperature and/or reduced extension at elevated temperature can be made available.

The problem was solved by the aqueous binder composition mentioned at the beginning.

One essential constituent of the aqueous binder composition is a polymer P which in polymerized form is constructed from
  ≥0.1 and ≤2.5 wt % of at least one acid-functional ethylenically unsaturated monomer (monomers A)
  ≥0 and ≤4.0 wt % of at least one ethylenically unsaturated carboxylic acid nitrile or dinitrile (monomers B)
  ≥0 and ≤2.0 wt % of at least one crosslinking monomer having two or more nonconjugated ethylenically unsaturated groups (monomers C)
  ≥0 and ≤10 wt % of at least one α,β-monoethylenically unsaturated $C_3$ to $C_6$ mono- or dicarboxamide (monomers D)
  ≥25 and ≤69.9 wt % of at least one ethylenically unsaturated monomer whose homopolymer has a glass transition temperature ≤30° C. and which differs from the monomers A to D (monomers E), and
  ≥30 and ≤70 wt % of at least one ethylenically unsaturated monomer whose homopolymer has a glass transition temperature ≥50° C. and which differs from the monomers A to D (monomers F).

As monomers A there come into consideration all ethylenically unsaturated compounds which include at least one acid group [proton donor], for example a sulfonic acid, phosphonic acid or carboxylic acid group, e.g., vinylsulfonic acid, allylsulfonic acid, styrenesulfonic acid, 2-acrylamidomethylpropanesulfonic acid, vinylphosphonic acid, allylphosphonic acid, styrenephosphonic acid and 2-acrylamido-2-methylpropanephosphonic acid. Advantageously, however, the monomers A are α,β-monoethylenically unsaturated, especially $C_3$ to $C_6$ and preferably $C_3$ or $C_4$ mono- or dicarboxylic acids such as, for example acrylic acid, methacrylic acid, ethylacrylic acid, itaconic acid, allylacetic acid, crotonic acid, vinylacetic acid, fumaric acid, maleic acid, 2-methylmaleic acid. But the monomers A also comprise the anhydrides of appropriate α,β-monoethylenically unsaturated dicarboxylic acids, for example maleic anhydride or 2-methylmaleic anhydride. The monomer A is preferably selected from the group comprising acrylic acid, methacrylic acid, crotonic acid, fumaric acid, maleic acid, maleic anhydride, 2-methylmaleic acid and itaconic acid, of which acrylic acid, methacrylic acid and/or itaconic acid are particularly preferred. It will be appreciated that the monomers A also comprise the fully or partially neutralized water-soluble salts, especially the alkali metal or ammonium salts, of the aforementioned acids.

The amount of monomer A polymerized into polymer P is $\geq 0.1$ and $\leq 2.5$ wt %, preferably $\geq 0.5$ and $\leq 2.0$ wt % and more preferably $\geq 1.0$ and $\leq 2.0$ wt %.

As monomers B there come into consideration all ethylenically unsaturated compounds which include at least one nitrile group. Advantageously, however, the monomers B are nitriles derived from the aforementioned $\alpha,\beta$-monoethylenically unsaturated, especially $C_3$ to $C_6$ and preferably $C_3$ or $C_4$, mono- or dicarboxylic acids, for example acrylonitrile, methacrylonitrile, maleonitrile and/or fumaronitrile, of which acrylonitrile and/or methacrylonitrile are particularly preferred.

The amount of monomer B polymerized into polymer P is $\geq 0$ and $\leq 4.0$ wt %, preferably $\geq 0$ and $\leq 2.0$ wt % and more preferably $\geq 0$ and $\leq 1.0$ wt % in one preferred embodiment. In a further embodiment, the amount of monomer B polymerized into Polymer P is $\geq 0.5$ and $\leq 3.0$ wt % and preferably $\geq 1.0$ and $\leq 2.5$ wt %.

As monomers C there come into consideration all compounds which include at least two nonconjugated ethylenically unsaturated groups. Examples thereof are monomers including two vinyl radicals, monomers including two vinylidene radicals and also monomers including two alkenyl radicals. Of particular advantage here are the diesters of dihydric alcohols with $\alpha,\beta$-monoethylenically unsaturated monocarboxylic acids, among which acrylic acid and methacrylic acid are preferred. Examples of such monomers including two nonconjugated ethylenically unsaturated double bonds are alkylene glycol diacrylates and alkylene glycol dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, triesters of trihydric alcohols with $\alpha,\beta$-monoethylenically unsaturated monocarboxylic acids, for example glycerol triacrylate, glycerol trimethacrylate, trimethylolpropane triacrylate, trimethylolpropane trimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. 1,4-Butylene glycol diacrylate, allyl methacrylate and/or divinylbenzene are particularly preferred.

The amount of monomer C polymerized into polymer P is $\geq 0$ and $\leq 2.0$ wt %, preferably $\geq 0.1$ and $\leq 1.5$ wt % and more preferably $\geq 0.3$ and $\leq 1.2$ wt %.

As monomers D there come into consideration all $\alpha,\beta$-monoethylenically unsaturated $C_3$ to $C_6$ mono- or dicarboxamides. The monomers D likewise include the aforementioned compounds whose carboxamide group is substituted with an alkyl group or with a methylol group. Examples of monomers D are the amides or diamides of $\alpha,\beta$-monoethylenically unsaturated $C_3$ to $C_6$ and preferably $C_3$ or $C_4$ mono- or dicarboxylic acids such as, for example, acrylamide, methacrylamide, ethylacrylamide, itaconic acid monoamide, itaconic acid diamide, allylacetamide, crotonic acid monoamide, crotonic acid diamide, vinylacetamide, fumaric acid monoamide, fumaric acid diamide, maleic acid monoamide, maleic acid diamide, 2-methylmaleic acid monoamide and 2-methylmaleic acid diamide. Examples of $\alpha,\beta$-monoethylenically unsaturated $C_3$ to $C_6$ mono- or dicarboxamides whose carboxamide group are substituted with an alkyl group or with a methylol group are N-alkylacrylamides and N-alkylmethacrylamides, e.g., N-tert-butylacrylamide and N-tert-butylmethacrylamide, N-methylacrylamide and N-methylmethacrylamide, and N-methylolacrylamide and N-methylolmethacrylamide. Preferred monomers D are acrylamide, methacrylamide, N-methylolacrylamide and/or N-methylolmethacrylamide, of which methylolacrylamide and/or N-methylolmethacrylamide are particularly preferred.

The amount of monomer D optionally polymerized into polymer P is $\geq 0$ and $\leq 10$ wt %, preferably $\geq 0$ and $\leq 4.0$ wt % and more preferably 0 wt % in one preferred embodiment. In another preferred embodiment, the amount of monomer D polymerized into polymer P is $\geq 0.1$ and $\leq 5.0$ wt %, advantageously $\geq 0.5$ and $\leq 3.0$ wt % and more advantageously $\geq 1.0$ and $\leq 2.5$ wt %.

As monomers E there come into consideration all ethylenically unsaturated monomers whose homopolymer have a glass transition temperature $\leq 30°$ C. and which differ from the monomers A to D. Suitable monomers E are for example conjugated aliphatic $C_4$ to $C_9$ diene compounds, esters of vinyl alcohol and a $C_1$ to $C_{10}$ monocarboxylic acid, $C_1$ to $C_{10}$ alkyl acrylate, $C_5$ to $C_{10}$ alkyl methacrylate, $C_5$ to $C_{10}$ cycloalkyl acrylate, $C_5$ to $C_{10}$ cycloalkyl methacrylate, $C_1$ to $C_{10}$ dialkyl maleate and/or $C_1$ to $C_{10}$ dialkyl fumarate, vinyl ethers of $C_3$ to $C_{10}$ alkanols, branched and unbranched $C_3$ to $C_{10}$ olefins. It is advantageous to use such monomers E whose homopolymers have Tg values $<0°$ C. It is particularly advantageous for vinyl acetate, ethyl acrylate, n-propyl acrylate, n-butyl acrylate, isobutyl acrylate, sec-butyl acrylate, n-hexyl acrylate, 2-ethylhexyl acrylate, n-hexyl methacrylate, 2-ethylhexyl methacrylate, di-n-butyl maleate, di-n-butyl fumarate to be used as monomers E, for which 2-ethylhexyl acrylate, n-butyl acrylate, 1,4-butadiene and/or ethyl acrylate are particularly preferred.

The amount of monomer E polymerized into polymer P is $\geq 25$ and $\leq 69.9$ wt %, preferably $\geq 30$ and $\leq 60$ wt % and more preferably $\geq 30$ and $\leq 50$ wt %.

As monomers F there come into consideration all ethylenically unsaturated monomers whose homopolymer have a glass transition temperature $\geq 50°$ C. and which differ from the monomers A to D. Suitable monomers F are for example vinylaromatic monomers and $C_1$ to $C_4$ alkyl methacrylates. Vinylaromatic monomers are more particularly derivatives of styrene or of $\alpha$-methylstyrene in each of which the phenyl nuclei are optionally substituted by 1, 2 or 3 $C_1$ to $C_4$ alkyl groups, halogen, especially bromine or chlorine and/or methoxy groups. Preference is given to such monomers whose homopolymers have a glass transition temperature $\geq 80°$ C. Particularly preferred monomers are styrene, $\alpha$-methylstyrene, o-vinyltoluene, p-vinyltoluene, p-acetoxystyrene, p-bromostyrene, p-tert-butylstyrene, o-chlorostyrene, m-chlorostyrene, p-chlorostyrene, methyl methacrylate, tert-butyl acrylate, tert-butyl methacrylate, ethylmethacrylate, isobutyl methacrylate, n-hexyl acrylate, cyclohexyl methacrylate, but also for example tert-butyl vinyl ether or cyclohexyl vinyl ether, although methyl methacrylate, styrene and/or tert-butyl methacrylate are particularly preferred.

The amount of monomer F polymerized into polymer P is $\geq 30$ and $\leq 70$ wt %, preferably $\geq 40$ and $\leq 70$ wt % and more preferably $\geq 40$ and $\leq 60$ wt %.

The reference to a glass transition temperature Tg is to be understood as meaning the glass transition temperature limit which the glass transition temperature approaches with increasing molecular weight, according to G. Kanig (Kolloid-Zeitschrift & Zeitschrift für Polymere, volume 190, page 1, equation 1). Tg is determined by the DSC method (Differential Scanning Calorimetry, 20 K/min, midpoint measurement, DIN 53 765). The Tg values for the homopolymers of most monomers are known and are listed for example in Ullmann's Encyclopedia of Industrial Chemistry, VCH Weinheim, 1992, Volume 5, Vol. A21, p. 169; further sources for glass transition temperatures of homopolymers include for example J. Brandrup, E. H. Immergut, Polymer Handbook, 1st Ed., J. Wiley, New York 1966, 2nd Ed. J. Wiley, New York 1975, and 3rd Ed. J. Wiley, New York 1989).

$C_1$ to $C_{10}$ Alkyl groups herein are linear or branched alkyl radicals of 1 to 10 carbon atoms, for example methyl, ethyl, n-propyl, isopropyl, n-butyl, sec-butyl, isobutyl, tert-butyl, n-pentyl, isopentyl, tert-pentyl n-hexyl, 2-ethylhexyl, n-nonyl or n-decyl. $C_5$ to $C_{10}$ cycloalkyl groups are preferably cyclopentyl or cyclohexyl groups, which may optionally be substituted by 1, 2 or 3 $C_1$ to $C_4$ alkyl groups.

The aqueous binder compositions advantageously comprise polymers P whose at least one monomer E is selected from the group comprising conjugated aliphatic $C_4$ to $C_9$ diene compounds, esters of vinyl alcohol and a $C_1$ to $C_{10}$ monocarboxylic acid, $C_1$ to $C_{10}$ alkyl acrylate, $C_5$ to $C_{10}$ alkyl methacrylate, $C_5$ to $C_{10}$ cycloalkyl acrylate, $C_5$ to $C_{10}$ cycloalkyl methacrylate, $C_1$ to $C_{10}$ dialkyl maleinate and/or $C_1$ to $C_{10}$ dialkyl fumarate and at least one monomer F is selected from the group comprising vinylaromatic monomers and/or $C_1$ to $C_4$ alkyl methacrylate.

It is likewise advantageous for the aqueous binder compositions to include polymers P comprising ≥0.1 and ≤1.5 wt % of at least one monomer C in polymerized form.

In one preferred embodiment, the aqueous binder composition comprises a polymer P constructed from
≥0.5 and ≤2.0 wt % of at least one monomer A
≥0.1 and ≤1.5 wt % of at least one monomer C
≥0 and ≤4.0 wt % of at least one monomer D
≥30 and ≤60 wt % of at least one monomer E, and
≥40 and ≤70 wt % of at least one monomer F.

In one preferred embodiment, the aqueous binder composition comprises a polymer P constructed in polymerized form from
≥1.0 and ≤2.0 wt % of acrylic acid, methacrylic acid and/or itaconic acid
≥0.3 and ≤1.2 wt % of butanediol diacrylate, allyl methacrylate and/or divinylbenzene
≥0 and ≤4.0 wt % of acrylamide, methacrylamide, N-methylolacrylamide and/or N-methylolmethacrylamide
≥30 and ≤50 wt % of 2-ethylhexyl acrylate, n-butyl acrylate, 1,4-butadiene and/or ethyl acrylate, and
≥40 and ≤60 wt % of methyl methacrylate, styrene and/or tert-butyl methacrylate.

The preparation of polymers P will in principle be familiar to a person skilled in the art and is effected for example through free-radical polymerization of monomers A to F by the method of substance, emulsion, solution, precipitation or suspension polymerization, although free-radically initiated aqueous emulsion polymerization is particularly preferred. It is therefore advantageous according to the present invention for the polymer P to be dispersed in an aqueous medium, i.e., used in the form of an aqueous polymer dispersion.

The performance of free-radically initiated emulsion polymerizations of ethylenically unsaturated monomers in an aqueous medium has been extensively described and therefore is sufficiently familiar to a person skilled in the art [cf. Emulsion polymerization in Encyclopedia of Polymer Science and Engineering, Vol. 8, pages 659 ff. (1987); D. C. Blackley, in High Polymer Latices, Vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Hölscher, Springer-Verlag, Berlin (1969)]. A free-radically initiated aqueous emulsion polymerization is typically carried out by the ethylenically unsaturated monomers being dispersed in an aqueous medium, generally by co-use of dispersing assistants, such as emulsifiers and/or protective colloids, and polymerized using at least one water-soluble free-radical polymerization initiator. Frequently, in the aqueous polymer dispersions obtained, the residual contents of unconverted ethylenically unsaturated monomers are reduced by chemical and/or physical methods likewise known to a person skilled in the art [see for example EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is adjusted to a desired value by thinning or concentrating, or the aqueous polymer dispersion is mixed with further customary addition agents, for example bactericidal, foam- or viscosity-modifying additives. From this general procedure, the production of an aqueous dispersion of polymer P merely differs by the specific use of the aforementioned monomers A to F. It will be appreciated in this connection that producing polymer P herein shall also comprise the seed, staged and gradient modes of operation which are familiar to a person skilled in the art.

Therefore, according to the present invention, the aqueous binder compositions are advantageously obtained using aqueous dispersions of a polymer P constructed from
≥0.1 and ≤2.5 wt % of at least one monomer A
≥0 and ≤4.0 wt % of at least one monomer B
≥0 and ≤2.0 wt % of at least one monomer C
≥0 and ≤10 wt % of at least one monomer D
≥25 and ≤69.9 wt % of at least one monomer E, and
≥30 and ≤70 wt % of at least one monomer F,
advantageously from
≥0.5 and ≤2.0 wt % of at least one monomer A
≥0.1 and ≤1.5 wt % of at least one monomer C
≥0 and ≤4.0 wt % of at least one monomer D
≥30 and ≤60 wt % of at least one monomer E, and
≥40 and ≤70 wt % of at least one monomer F
and more advantageously from
≥1.0 and ≤2.0 wt % of acrylic acid, methacrylic acid and/or itaconic acid
≥0.3 and ≤1.2 wt % of butanediol diacrylate, allyl methacrylate and/or divinylbenzene
≥0 and ≤4.0 wt % of acrylamide, methacrylamide, N-methylolacrylamide and/or N-methylolmethacrylamide
≥30 and ≤50 wt % of 2-ethylhexyl acrylate, n-butyl acrylate, 1,4-butadiene and/or ethyl acrylate, and
≥40 and ≤60 wt % of methyl methacrylate, styrene and/or tert-butyl methacrylate,
in polymerized form.

The polymers P used according to the present invention are obtainable in the form of their aqueous polymer dispersion by initially charging the overall amount of monomers A to F in the aqueous reaction medium before initiating the polymerization reaction. However, it is also possible to optionally merely initially charge a portion of monomers A to F in the aqueous reaction medium before initiating the polymerization reaction and then, after initiating the polymerization, to add the overall amount or, as may be, the remaining quantity under polymerization conditions during the free-radical emulsion polymerization at the rate of consumption, continuously with constant or varying flow rates, or discontinuously. The monomers A to F can be dosed as separate individual streams, as homogeneous or inhomogeneous (partial) mixtures, or as monomer emulsion. Advantageously, the monomers A to F are dosed in the form of a monomer mixture and more particularly in the form of an aqueous monomer emulsion.

The polymers P used according to the present invention are obtained in the form of their aqueous polymer dispersion by co-using dispersing assistants which keep both the monomer droplets and the produced polymer particles in a state of dispersion in the aqueous medium and so ensure the stability of the aqueous polymer dispersion produced. As dispersing assistants there come into consideration the protective colloids typically used for performance of free-radical aqueous emulsion polymerizations as well as emulsifiers.

Suitable protective colloids are for example polyvinyl alcohols, polyalkylene glycols, alkali metal salts of polyacrylic acids and polymethacrylic acids, gelatin derivatives or acrylic acid, methacrylic acid, maleic anhydride, 2-acrylamido-2-methylpropanesulfonic acid and/or 4-styrenesulfonic acid-containing copolymers and their alkali metal salts but also N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, aminobearing acrylates, methacrylates, acrylamides and/or methacrylamides-containing homo- and copolymers. An extensive description of further suitable protective colloids is given in Houben-Weyl, Methoden der organischen Chemie, volume XIV/1, Makromolekulare Stoffe, Georg-Thieme-Verlag, Stuttgart, 1961, pages 411 to 420.

It will be appreciated that mixtures of protective colloids and/or emulsifiers can also be used. Frequently, the dispersing agents used are exclusively emulsifiers whose relative molecular weights are typically below 1000, unlike protective colloids. They can be anionic, cationic or nonionic in nature. It will be appreciated that, when the mixtures of surface-active substances are used, the individual components have to be compatible with each or one another, which in the case of doubt can be verified in a few preliminary tests. In general, anionic emulsifiers are compatible with other anionic emulsifiers and with nonionic emulsifiers. The same applies to cationic emulsifiers, while anionic and cationic emulsifiers are usually not compatible with one another. An overview of suitable emulsifiers is given in Houben-Weyl, Methoden der organischen Chemie, volume XIV/1, Makromolekulare Stoffe, Georg-Thieme-Verlag, Stuttgart, 1961, pages 192 to 208.

However, especially emulsifiers are used as dispersing assistants.

Customary nonionic emulsifiers are for example ethoxylated mono-, di- and tri-alkylphenols (EO degree: 3 to 50, alkyl radical: $C_4$ to $C_{12}$) and also ethoxylated fatty alcohols (EO degree: 3 to 80, alkyl radical: $C_8$ to $C_{36}$). Examples thereof are the Lutensol® A brands ($C_{12}C_{14}$ fatty alcohol ethoxylates, EO degree: 3 to 8), Lutensol® AO brands ($C_{13}C_{15}$ oxo process alcohol ethoxylates, EO degree: 3 to 30), Lutensol® AT brands ($C_{16}C_{18}$ fatty alcohol ethoxylates, EO degree: 11 to 80), Lutensol® ON brands ($C_{10}$-oxo process alcohol ethoxylates, EO degree: 3 to 11) and the Lutensol® TO brands ($C_{13}$ oxo process alcohol ethoxylates, EO degree: 3 to 20) from BASF SE.

Customary anionic emulsifiers are for example alkali metal and ammonium salts of alkyl sulfates (alkyl radical: $C_8$ to $C_{12}$), of sulfuric monoesters of ethoxylated alkanols (EO degree: 4 to 30, alkyl radical: $C_{12}$ to $C_{18}$) and ethoxylated alkylphenols (EO degree: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$).

Suitable anionic emulsifiers further include compounds of the general formula (I)

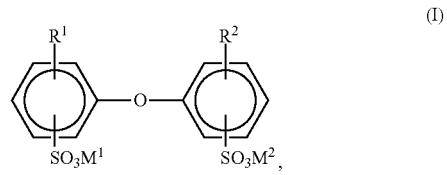

where $R^1$ and $R^2$ are H atoms or $C_4$ to $C_{24}$ alkyl that are not H atoms at the same time, and $M^1$ and $M^2$ can be alkali metal ions and/or ammonium ions. In the general formula (I), $R^1$ and $R^2$ are preferably linear or branched alkyl radicals of 6 to 18 carbon atoms and more particularly of 6, 12 and 16 carbon atoms, or hydrogen, with the proviso that $R^1$ and $R^2$ are not both an H atom at the same time. $M^1$ and $M^2$ are each preferably sodium, potassium or ammonium, of which sodium is particularly preferred. Particularly advantageous are compounds (I) in which $M^1$ and $M^2$ are both sodium, $R^1$ is a branched alkyl radical of 12 carbon atoms and $R^2$ an H atom or $R^1$. Technical grade mixtures are frequently used that include a 50 to 90 wt % fraction of monoalkylated product, for example Dowfax® 2A1 (trademark of Dow Chemical Company). Compounds (I) are common knowledge, for example from U.S. Pat. No. 4,269,749, and commercially available.

Suitable cation-active emulsifiers are generally $C_6$-$C_{18}$-alkyl-, -alkylaryl- or heterocyclyl-containing primary, secondary, tertiary or quaternary ammonium salts, alkanolammonium salts, pyridinium salts, imidazolinium salts, oxazolinium salts, morpholinium salts, thiazolinium salts and also salts of amine oxides, quinolinium salts, isoquinolinium salts, tropylium salts, sulfonium salts and phosphonium salts. Examples which may be mentioned are dodecylammonium acetate and the corresponding sulfate, the sulfates or acetates of the various 2-(N,N,N-trimethylammonium)ethyl paraffinic acid esters, N-cetylpyridinium sulfate, N-laurylpyridinium sulfate and also N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate and also the Gemini surfactant N,N'(lauryldimethyl)ethylenediamine disulfate, ethoxylated tallowalkyl N-methylammonium sulfate and ethoxylated oleylamine (for example Uniperol® AC from BASF SE, about 11 ethylene oxide units). Numerous further examples are given in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. It is beneficial when the anionic counter-groups have very low nucleophilicity, for example perchlorate, sulfate, phosphate, nitrate and carboxylates, for example acetate, trifluoroacetate, trichloroacetate, propionate, oxalate, citrate, benzoate, and also conjugated anions of organosulfonic acids, for example methylsulfonate, trifluoromethylsulfonate and para-toluenesulfonate, further tetrafluoroborate, tetraphenylborate, tetrakis(pentafluorophenyl)borate, tetrakis[bis(3,5-trifluoromethyl)phenyl]borate, hexafluorophosphate, hexafluoroarsenate or hexafluoroantimonate.

The emulsifiers preferred for use as dispersing assistants are advantageously used in an overall amount ≥0.005 and ≤10 wt %, preferably ≥0.01 and ≤5 wt % and more particularly ≥0.1 and ≤3 wt %, all based on the overall amount of monomers A to F (total monomer quantity).

The overall amount of the protective colloids used as dispersing assistants in addition to or in lieu of emulsifiers is often ≥0.1 and ≤40 wt % and frequently ≥0.2 and ≤25 wt %, all based on the total monomer quantity.

Preferably, however, it is anionic and/or nonionic emulsifiers and more preferably anionic emulsifiers that are used as dispersing assistants.

The polymers P used according to the present invention are obtainable in the form of their aqueous polymer dispersion by initially charging the overall amount of dispersing assistant in the aqueous reaction medium before initiating the polymerization reaction. However, it is also possible to optionally merely initially charge a portion of the dispersing assistant in the aqueous reaction medium before initiating the polymerization reaction and then to add the overall amount or as the case may be any remaining quantity of dispersing assistant under polymerization conditions during the free-radical emulsion polymerization, continuously or batchwise. Preferably, the main or overall quantity of dispersing assistant is added in the form of an aqueous monomer emulsion.

The free-radically initiated aqueous emulsion polymerization is triggered using a free-radical polymerization initiator. In principle, not only peroxides but also azo compounds can be concerned here. Redox initiator systems also come into consideration, as will be appreciated. As peroxides there can be used in principle inorganic peroxides, such as hydrogen peroxide or peroxodisulfates, such as the mono- or di-alkali metal or ammonium salts of peroxodisulfuric acid, for example its mono- and di-sodium, potassium or ammonium salts or organic peroxides, such as alkyl hydroperoxides, for example tert-butyl hydroperoxide, p-mentyl hydroperoxide or cumyl hydroperoxide, and also dialkyl or diaryl peroxides, such as di-tert-butyl or dicumyl peroxide. As azo compound it is essentially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals) which are used. As oxidizing agents for redox initiator systems it is essentially the above-mentioned peroxides which come into consideration. As corresponding reducing agents there can be used sulfur compounds of low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of multivalent metals, such as iron(II) sulfate, iron(II) ammonium sulfate, iron(II) phosphate, enediols, such as dihydroxymaleic acid, benzoin and/or ascorbic acid and also reducing saccharides, such as sorbose, glucose, fructose and/or dihydroxyacetone. In general, the amount of free-radical initiator used is from 0.01 to 5 wt %, preferably 0.1 to 3 wt % and more preferably 0.2 to 1.5 wt %, based on the total monomer quantity.

The polymers P used according to the present invention are obtainable in the form of their aqueous polymer dispersion by initially charging the overall amount of free-radical initiator in the aqueous reaction medium before initiating the polymerization reaction. However, it is also possible to optionally initially charge merely a portion of the free-radical initiator in the aqueous reaction medium before initiating the polymerization reaction and then to add the overall amount or as the case may be any remaining quantity under polymerization conditions during the free-radical emulsion polymerization at the rate of consumption, continuously or discontinuously.

Initiating the polymerization reaction refers to starting the polymerization reaction of the monomers in the polymerization vessel after free-radical formation on the part of the free-radical initiator. The polymerization reaction can be initiated by addition of free-radical initiator to the aqueous polymerization mixture in the polymerization vessel under polymerization conditions. However, it is also possible for the addition of some or all of the free-radical initiator to the aqueous polymerization mixture comprising the initially charged monomers, in the polymerization vessel, to take place under conditions which are not suitable for triggering a polymerization reaction, for example at low temperature, and for polymerization conditions to be established in the aqueous polymerization mixture thereafter. Polymerization conditions are generally those temperatures and pressures under which the free-radically initiated aqueous emulsion polymerization proceeds at a sufficient polymerization rate. They are more particularly dependent on the free-radical initiator used. Advantageously, free-radical initiator type and quantity, the polymerization temperature and the polymerization pressure are selected such that the free-radical initiator has a half-life <3 hours, more advantageously <1 hour and even more advantageously <30 minutes, while sufficient starting free-radicals are available at all times in order that the polymerization reaction may be initiated and maintained.

The entire range from 0 to 170° C. comes into consideration as reaction temperature for the free-radical aqueous emulsion polymerization. Temperatures employed are generally in the range from 50 to 120° C., preferably in the range from 60 to 110° C. and more preferably in the range from 70 to 100° C. The free-radical aqueous emulsion polymerization can be carried out at a pressure below, equal to or above 1 atm [1.013 bar (absolute), atmospheric pressure], so that the polymerization temperature can exceed 100° C. and range up to 170° C. In the presence of monomers A to F having a low boiling point, the emulsion polymerization is preferably performed under elevated pressure. This pressure can assume values of 1.2, 1.5, 2, 5, 10, 15 bar (absolute) or even higher. When the emulsion polymerization is carried out under reduced pressure, pressures of 950 mbar, frequently of 900 mbar and often 850 mbar (absolute) are set. Advantageously, the free-radical aqueous emulsion polymerization is carried out at 1 atm in the absence of oxygen, more particularly under an inert gas, for example under nitrogen or argon.

The aqueous reaction medium can in principle also comprise minor amounts (<5 wt %) of water-soluble organic solvents, for example methanol, ethanol, isopropanol, butanols, pentanols, but also acetone etc. Preferably, however, the process of the present invention is carried out in the absence of such solvents.

In addition to the aforementioned components, chain transfer agents can optionally also be used during the emulsion polymerization to reduce/police the molecular weight of the polymers P obtainable by the polymerization. Here it is essentially aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, for example 2-hydroxyethanethiol, aromatic thiols, such as benzenethiol, ortho-benzenethiol, meta-methylbenzenethiol or para-methylbenzenethiol, and also all further sulfur compounds described in Polymerhandbook 3rd edition, 1989, J. Brandrup and E. H. Immergut, John Wiley & Sons, section II, pages 133 to 141, but also aliphatic and/or aromatic aldehydes, such as acetaldehyde, propionaldehyde and/or benzaldehyde, unsaturated fatty acids, such as oleic acid, dienes with nonconjugated double bonds, such as divinylmethane or vinylcyclohexane or hydrocarbons having readily extractable hydrogen atoms, such as toluene for example, which are used. But it is also possible to use mixtures of aforementioned chain transfer agents that are noninterfering.

The total amount of chain transfer agents optionally used during the emulsion polymerization is generally ≤5 wt %, often ≤3 wt % and frequently ≤1 wt %, based on the total monomer quantity.

It is beneficial when all or some of the optional chain transfer agent is added to the aqueous reaction medium prior to initiating the free-radical polymerization. In addition, all or some of the chain transfer agent can advantageously be added to the aqueous reaction medium together with the monomers A to F during the polymerization.

The polymers P obtainable by the emulsion polymerization can in principle have glass transition temperatures Tg in the range of ≥−70 and ≤150° C. Advantageously, the monomers A, B, D, E and F are chosen in terms of type and amount such that the polymers formed merely therefrom have a glass transition temperature Tg in the range of ≥−10 and ≤70° C. and advantageously in the range ≥5 and ≤50° C. and more advantageously in the range ≥5 and ≤35° C. Glass transition temperature Tg herein is to understood as meaning the midpoint temperature as per ASTM D 3418-82, determined by differential scanning calorimetry (DSC) [cf. also Ullmann's Encyclopedia of Industrial Chemistry, page 169, Verlag Chemie, Weinheim, 1992 and Zosel in Farbe und Lack, 82, pages 125 to 134, 1976].

According to Fox (T. G. Fox, Bull. Am. Phys. Soc. 1956 [Ser. II]1, page 123 and as per Ullmann's Encyclopädie der technischen Chemie, volume 19, page 18, 4th edition, Verlag Chemie, Weinheim, 1980) the glass transition temperature of at most lightly crosslinked copolymers is given to good approximation by:

$$1/Tg = x_1/Tg_1 + x_2/Tg_2 + \ldots x_n/Tg_n,$$

where $x_1, x_2, \ldots x_n$ are the mass fractions of monomers 1, 2, ... n and $Tg_1, Tg_2, \ldots Tg_n$ are the glass transition temperatures in degrees kelvin of the polymers each constructed of just one of the monomers 1, 2, ... n. The glass transition temperatures of these homopolymers of most ethylenically unsaturated monomers are known (or are simple to determine experimentally in a conventional manner) and are listed for example in J. Brandrup, E. H. Immergut, Polymer Handbook 1st Ed. J. Wiley, New York, 1966, 2nd Ed. J. Wiley, New York, 1975 and 3rd Ed. J. Wiley, New York, 1989, and also in Ullmann's Encyclopedia of Industrial Chemistry, page 169, Verlag Chemie, Weinheim, 1992.

It is essential that the free-radically initiated aqueous emulsion polymerization can also be carried out in the presence of a polymer seed, for example in the presence of 0.01 to 3 wt %, frequently of 0.02 to 2 wt % and often of 0.04 to 1.5 wt % of a polymer seed, all based on the total monomer quantity.

A polymer seed is used in particular when the particle size of the polymer particles to be obtained by free-radical aqueous emulsion polymerization is to be set to a specific value (see for example U.S. Pat. No. 2,520,959 and U.S. Pat. No. 3,397,165).

One polymer seed used in particular has polymer seed particles with a narrow particle size distribution and weight average diameter Dw≤100 nm, often ≥5 nm to ≤50 nm and often ≥15 nm to ≤35 nm. Weight average particle diameter determination is known to a person skilled in the art and is done via the analytical ultracentrifuge method for example. Weight average particle diameter herein is to be understood as being the weight average Dw50 value determined by the analytical ultracentrifuge method (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175).

Narrow particle size distribution herein is to be understood as meaning that the ratio of the analytical ultracentrifuge method weight average particle diameters Dw50 and number average particle diameters DN50 [Dw50/DN50] is <2.0, preferably <1.5 and more preferably <1.2 or <1.1.

The polymer seed is typically used in the form of an aqueous polymer dispersion. The aforementioned amount recitations are based on the polymer solids content of the aqueous polymer seed dispersion.

When a polymer seed is used it is advantageous to employ an exogenous polymer seed. Unlike an in situ polymer seed, which is prepared in the reaction vessel before the actual emulsion polymerization is commenced, and which generally has the same monomeric composition as the polymer prepared by the ensuing free-radically initiated aqueous emulsion polymerization, an exogenous polymer seed is a polymer seed which has been prepared in a separate reaction step and whose monomeric composition differs from the polymer prepared by the free-radically initiated aqueous emulsion polymerization, although this means nothing more than that different monomers, or monomer mixtures with a different composition, are used for preparing the exogenous polymer seed and for preparing the aqueous polymer dispersion. Preparing an exogenous polymer seed is familiar to a person skilled in the art and is typically accomplished by the introduction as initial charge to a reaction vessel of a relatively small amount of monomers and also a relatively large amount of emulsifiers, and by the addition at reaction temperature of a sufficient amount of polymerization initiator.

It is preferred in accordance with the present invention to use an exogenous polymer seed having a glass transition temperature ≥50° C., frequently ≥60° C. or ≥70° C. and often ≥80° C. or ≥90° C. A polystyrene or polymethyl methacrylate polymer seed is preferred in particular.

The total amount of exogenous polymer seed can be initially charged to the polymerization vessel. But it is also possible to merely include a portion of the exogenous polymer seed in the initial charge to the polymerization vessel and to add the remainder during the polymerization together with monomers A to F. If necessary, however, the total polymer seed quantity can also be added during the polymerization. Preferably, the total amount of exogenous polymer seed is initially charged to the polymerization vessel before initiating the polymerization reaction.

The aqueous polymer P dispersions obtainable by emulsion polymerization typically have a polymer solids content of ≥10 and ≤70 wt %, frequently ≥20 and ≤65 wt % and often ≥25 and ≤60 wt %, all based on the aqueous polymer dispersion. The number average particle diameter as determined by quasi-elastic light scattering (ISO standard 13 321) (cumulant z-average) is generally in the range ≥10 and ≤2000 nm, frequently in the range ≥10 and ≤700 nm and often in the range ≥50 to ≤400 nm.

It will be appreciated that aqueous polymer P dispersions are also obtainable in principle in the form of so-called secondary polymer dispersions (concerning in-principle preparation of secondary polymer dispersions see for example Eckersley et al., Am. Chem. Soc., Div. Polymer Chemistry, 1977, 38(2), pages 630, 631, U.S. Pat. No. 3,360,599, U.S. Pat. No. 3,238,173, U.S. Pat. No. 3,726,824, U.S. Pat. No. 3,734,686 or U.S. Pat. No. 6,207,756). Secondary aqueous polymer P dispersions are generally obtained when polymers P obtained by the method of substance or solution polymerization are dissolved in a suitable organic solvent and dispersed in an aqueous medium to form aqueous polymer/solvent (mini)emulsions. Subsequent solvent removal yields the corresponding aqueous polymer P dispersions.

Accordingly, the aqueous binder compositions of the present invention comprise aqueous dispersions of polymers P whose number average particle diameter is in the range ≥10 and ≤2000 nm, advantageously in the range ≥10 and ≤700 nm and more advantageously in the range ≥50 to ≤400 nm.

At least one saccharide compound S is an essential constituent of the aqueous binder composition as well as at least one polymer P.

A saccharide compound S herein is to be understood as meaning monosaccharides, oligosaccharides, polysaccharides, sugar alcohols and also substitution products and derivatives thereof.

Monosaccharides are organic compounds of the generic formula $C_nH_{2n}O_n$, where n is an integer 5, 6, 7, 8 or 9. These monosaccharides are also known as pentoses, hexoses, heptoses, octoses or nonoses, and these compounds can be subdivided into the corresponding aldoses, which include an aldehyde group, and ketoses, which include a keto group. Accordingly, monosaccharides comprise aldo- or ketopentoses, aldo- or ketohexoses, aldo- or ketoheptoses, aldo- or ketooctoses or aldo- or ketononoses. Monosaccharide compounds which are preferred according to the present invention are the pentoses and hexoses which also occur in nature, of which glucose, mannose, galactose and/or xylose are particularly preferred. It will be appreciated that the present invention also comprehends all stereoisomers of all aforementioned monosaccharides.

Sugar alcohols are the hydrogenation products of the aforementioned aldo- or ketopentoses, aldo- or ketohexoses, aldo- or ketoheptoses, aldo- or ketooctoses or aldo- or ketononoses, which have the general formula $C_nH_{2n+2}O_n$, where n is an integer 5, 6, 7, 8 or 9. Mannitol, lactitol, sorbitol and xylitol are preferred sugar alcohols. It will be appreciated that the present invention shall also comprehend all stereoisomers of all aforementioned sugar alcohols.

It is known that the aforementioned monosaccharides are present in the form of their hemiacetals or -ketals, formed from a hydroxyl group and the aldehyde or keto group, respectively, generally with the formation of a five- or six-membered ring. If, then, a hydroxyl group (from the hemiacetal or hemiketal group or from the carbon scaffold chain) of one monosaccharide molecule reacts with the hemiacetal or hemiketal group of another monosaccharide molecule by water elimination to form an acetal or, respectively, ketal group (such a bond is also called glycosidic bond), disaccharides are obtained (with the general empirical formula $C_nH_{2n-2}O_{n-1}$). Furthermore, such a disaccharide can react with a further monosaccharide by water elimination to form a trisaccharide. Further reactions with monosaccharides give tetrasaccharides, pentasaccharides, hexasaccharides, heptasaccharides, octasaccharides, nonasaccharides or decasaccharides. Compounds constructed of at least two but not more than ten monosaccharide structural units via glycosidic bonds are known as oligosaccharides. Preferred oligosaccharides are disaccharides, among which it is lactose, maltose and/or sucrose which are particularly preferred. It will be appreciated that the present invention shall also comprehend all stereoisomers of all aforementioned oligosaccharides.

Saccharide compounds constructed of more than ten monosaccharide structural units are herein known as polysaccharide compounds. Polysaccharide compounds can in effect be constructed of the structural elements of a monosaccharide (so-called homoglycans) or the structural elements of two or more different monosaccharides (so-called heteroglycans). It is homoglycans which are preferably used according to the present invention.

Among the homoglycans it is the starches, which are constructed of α-D-glucose units, which are particularly preferred. The starches consist of the polysaccharides amylose (D-glucose units linked together α-1,4-glycosidically and amylopectin (D-glucose units linked together α-1,4- and additionally about 4% α-1,6-glycosidically). Naturally occurring starch typically comprises about 20 to 30 wt % of amylose and about 70 to 80 wt % of amylopectin. However, the ratio between amylose and amylopectin can vary as a result of breeding and according to plant species. Useful starches include all native starches, for example starches from maize, wheat, oats, barley, rice, millet, potatoes, peas, tapioca, sorghum or sago. Also of interest are those natural starches that have a high amount of amylopectin content such as waxy maize starch and waxy potato starch. The amylopectin content of these starches is ≥90 wt %, often ≥95 and ≤100 wt %.

It will be appreciated that the term saccharide compound S also comprises the substitution products and derivatives of the aforementioned mono-, oligo- and polysaccharide compounds and also of sugar alcohols.

In substitution products of a saccharide compound S, at least one hydroxyl group of saccharide compound S was functionalized, for example by esterification, etherification, oxidation, etc., with preservation of the saccharide structure. Esterification for example is effected by reacting the saccharide compound S with organic or inorganic acids, their anhydrides or halides. Phosphated and acetylated saccharide compounds are of particular interest. Etherification is generally effected by reacting the saccharide compounds with organic halogen compounds, epoxides or sulfates in aqueous alkaline solution. Known ethers are alkyl ethers, hydroxyalkyl ethers, carboxyalkyl ethers and allyl ethers. Oxidation of at least one hydroxyl group using an oxidizing agent customary in the organic chemistry of carbohydrates, for example nitric acid, hydrogen peroxide, ammonium persulfate, peroxyacetic acid, sodium hypochlorite and/or 2,2,6,6-tetramethyl-1-piperidinyloxy (TEMPO), gives rise to the corresponding keto compound (on oxidation of a secondary hydroxyl group), or carboxyl compound (on oxidation of a primary hydroxyl group).

Derivatives of saccharide compounds S are such reaction products of oligo- and polysaccharides as are obtained by cleaving at least one acetal or ketal group (at least one glycosidic bond) and therefore by degrading the original saccharide structure. Such degradation reactions are familiar to a person skilled in the art and they take place in particular in that an oligo- or polysaccharide compound is exposed to thermal, enzymatic, oxidative and/or hydrolytic conditions.

By way of saccharide compound S it is advantageous to use starch, cellulose, guaran, xanthan, alginate, pectin, chitosan, gum arabic, carrageenan, agar and/or gellan and also substitution products or derivatives thereof.

Particular preference is given to starches and/or starch derivatives and substitution products thereof, advantageously maltodextrin and/or glucose syrup.

DE value is a very common way in commercial practice to characterize the degree of starch degradation. DE is for dextrose equivalent and refers to the percentage fraction of the dry substance which is attributable to reducing sugars. The DE value therefore corresponds to the amount, in grams, of glucose (=dextrose) which would have the same reducing power per 100 g of dry substance. The DE value is a measure of how far polymer degradation has gone. Hence starches of low DE value have a high proportion of polysaccharides and a low content of low molecular weight mono- and oligosaccharides, while starches of high DE consist in the main of low molecular weight mono- or disaccharides. The maltodextrins preferred in the context of the present invention have DE values in the range from 3 to 20 and weight average molecular weights in the range from 15000 to 30000 g/mol. A glucose syrup likewise preferred in the context of the present invention has DE values in the range from 20 to 30 and weight average molecular weights in the range from 3000 to 9000 g/mol. Owing to their method of making, these products are obtained in the form of aqueous solutions and they are therefore generally also commercialized as such. Suitable solutions of maltodextrins have solids contents of 50 to 70 wt %, while suitable solutions of glucose syrup have solids contents of 70 to 95 wt %. Especially maltodextrins, however, are also obtainable in spray-dried form as powders. Preference according to the present invention is also given to modified degraded starches which have DE values of 1 to 3 and weight average molecular weights Mw in the range from 100000 to 1000000 g/mol and are typically obtainable as a solid material.

The saccharide compound S generally has a weight average molecular weight in the range $\geq 1000$ and $\leq 5000000$ g/mol, advantageously in the range $\geq 1000$ and $\leq 500000$ g/mol, preferably in the range $\geq 3000$ and $\leq 50000$ g/mol and more preferably in the range $\geq 5000$ and $\leq 25000$ g/mol. The weight average molecular weight here is determined using gel permeation chromatography with defined standards which is familiar to a person skilled in the art.

It is preferable when the saccharide compound S used according to the present invention has a solubility of $\geq 10$ g, advantageously $\geq 50$ g and more preferably $\geq 100$ g per liter of deionized water at 20° C. and atmospheric pressure. The present invention, however, also comprehends embodiments where the saccharide compound S has a solubility $\leq 10$ g per liter of deionized water at 20° C. and atmospheric pressure. Depending on the amount of these employed saccharide compounds S, these can then also be present in the form of their aqueous suspension. When saccharide compounds S are used according to the present invention in terms of type and amount such that they are present in aqueous suspension, it is advantageous when the saccharide S particles suspended in the aqueous medium have an average particle diameters are $\leq 5$ μm, preferably $\leq 3$ μm and more preferably $\leq 1$ μm. Average particle diameters are determined as for the aqueous polymer P dispersions via the method of quasi-elastic light scattering (ISO standard 13 321).

It is essential for the present invention that the total amount of saccharide compound S can be added to the aqueous polymerization medium before or during the emulsion polymerization of monomers A to F or to the aqueous dispersion of polymer P on completing the emulsion polymerization. As will be appreciated, it is also possible to add merely a portion of saccharide compound S to the aqueous polymerization medium before or during the emulsion polymerization of monomers A to F and the remainder to the aqueous dispersion of polymer P on completing the emulsion polymerization. When all or some of saccharide compound S is added before or during the emulsion polymerization of monomers A to F, the quantity added can generally perform the protective colloid function, making it possible to reduce the amount of other protective colloids and/or emulsifiers and/or to entirely dispense with them, if appropriate.

When the saccharide compound S is added before or during the emulsion polymerization of monomers A to F, the amount of saccharide compound S is generally $\geq 10$ and $\leq 90$ parts by weight, advantageously $\geq 10$ and $\leq 70$ parts by weight and more advantageously $\geq 15$ and $\leq 40$ parts by weight of saccharide compound S per 100 parts by weight of polymer P.

When the saccharide compound S is added after the emulsion polymerization, however, the amount of saccharide compound S will generally be $\geq 10$ and $\leq 400$ parts by weight, advantageously $\geq 25$ and $\leq 250$ parts by weight and more advantageously $\geq 40$ and $\leq 150$ parts by weight of saccharide compounds S per 100 parts by weight of polymer P.

It is essential that the aqueous binder composition of the present invention, in addition to polymer P and saccharide compound S, may additionally comprise still further components familiar to a person skilled in the art in terms of type and quantity, examples being thickeners, pigment dispersers, dispersants, emulsifiers, buffers, neutralizers, biocides, defoamers, polyol compounds having at least 2 hydroxyl groups and having a molecular weight $\leq 200$ g/mol, film formation auxiliaries, organic solvents, pigments or fillers etc.

Advantageously, however, the aqueous binder composition comprises $\leq 1$ wt %, more advantageously $\leq 0.5$ wt % of a polyol compound having at least 2 hydroxyl groups and having a molecular weight $\geq 200$ g/mol, especially $\leq 150$ g/mol, for example ethylene glycol, 1,2-propanediol, 1,3-propanediol, 1,2,3-propanetriol, 1,2-butanediol, 1,4-butanediol, 1,2,3,4-butanetetrol, diethanolamine, triethanolamine, etc., based on the summed overall amounts of polymer P and saccharide compound S.

The aqueous binder composition of the present invention is advantageously suitable for use as binder for granular and/or fibrous substrates. Therefore, the aqueous binder compositions mentioned can be used with advantage in the production of shaped articles from granular and/or fibrous substrates. The binder compositions of the present invention are further useful as binders in noncementitious coatings, for example flexible coatings for roofs, wet room coatings or mortar compositions, sealants, for example joint sealants and adhesives, for example assembly adhesives, tile adhesives, contact adhesives or floor covering adhesives.

Granular and/or fibrous substrates are familiar to a person skilled in the art. They are for example wood chips, wood fibers, cellulose fibers, textile fibers, polymeric fibers, glass fibers, mineral fibers or natural fibers such as jute, flax, hemp or sisal, but also cork chips or sand and also other organic or inorganic natural and/or synthetic granular and/or fibrous compounds whose longest dimension is ≤10 mm, preferably ≤5 mm and especially ≤2 mm in the case of granular substrates. As will be appreciated, the term substrate shall also comprehend the webs obtainable from fibers, for example so-called mechanically consolidated, for example needled or chemically prebonded fiber webs. It is especially advantageous that the aqueous binder composition of the present invention is useful as formaldehyde-free binder system for the aforementioned fibers and mechanically consolidated or chemically prebonded fiber webs.

The process for producing a shaped article from a granular and/or fibrous substrate and the aforementioned aqueous binder composition advantageously comprises applying the aqueous binder composition of the present invention to a granular and/or fibrous substrate (by impregnation), optionally shaping the granular and/or fibrous substrate treated (impregnated) with the aqueous binder composition and then subjecting the resulting granular and/or fibrous substrate to a thermal treatment step at a temperature ≥110° C., advantageously ≥130° C. and more advantageously ≥150° C., wherein the binder composition undergoes filming and curing.

It is essential that the essential components of the aqueous binder composition, i.e., the aqueous dispersion of polymer P and the saccharide compound S, especially in the form of its solution or suspension, can be mixed homogeneously before the applying to the granular and/or fibrous substrate. But it is also possible to mix these two components only immediately before the applying, for example using a static and/or dynamic mixing device. It is self-evidently also possible first to apply the aqueous dispersion of polymer P and then the aqueous solution or suspension of saccharide compound S to the granular and/or fibrous substrate, in which case the mixing takes place on the granular and/or fibrous substrate. Similarly, however, it is also possible first to apply the aqueous solution or suspension of the saccharide compound S and then the aqueous dispersion of polymer P to the granular and/or fibrous substrate. It will be appreciated that hybrid forms of applying the two essential components should also be comprehended according to the present invention.

Impregnating the granular and/or fibrous substrate generally takes the form of the aqueous binder composition being applied uniformly to the surface of the fibrous and/or granular substrate. The amount of aqueous binder composition is chosen such that, per 100 g of granular and/or fibrous substrate, ≥1 g and ≤100 g, preferably ≥2 g and ≤50 g and more preferably ≥5 g and ≤30 g of binder (reckoned as summed overall amounts of polymer P and saccharide compound S on solids basis) are used. The actual method of impregnating the granular and/or fibrous substrate is familiar to a person skilled in the art and is effected by drenching or spraying the granular and/or fibrous substrate for example.

After impregnation, the granular and/or fibrous substrate is optionally formed into the desired shape, for example by introduction into a heatable press or mold. Thereafter, the shaped impregnated granular and/or fibrous substrate is dried and cured in a manner familiar to a person skilled in the art.

Drying and/or curing of the optionally shaped impregnated granular and/or fibrous substrate frequently takes place in two temperature stages, with a drying stage being carried out at a temperature <100° C., preferably ≥20° C. and ≤90° C. and more preferably ≥40 and ≤80° C. and the curing stage at a temperature ≥110° C., preferably ≥130 and ≤150° C. and more preferably ≥180° C. and ≤220° C.

However, it is self-evidently also possible for the drying stage and the curing stage of the shaped articles to take place in one operation, for example in a molding press.

The shaped articles obtainable by the process of the present invention have advantageous properties, more particularly an improved transverse breaking strength and also distinctly lower extension at 180° C. compared with the prior art shaped articles.

The aqueous binder compositions of the present invention are therefore particularly advantageous for production of fiber webs based on polyester and/or glass fiber, which in turn are particularly useful for production of bituminized roofing membranes.

The actual method of producing bituminized roofing membranes is familiar to a person skilled in the art and is more particularly effected by application of liquefied optionally modified bitumen to one and/or both of the sides of a polyester and/or glass fiber web bonded with a binder composition of the present invention.

The examples which follow illustrate the invention and are nonlimiting.

EXAMPLES

I Preparation of Polymers P as their Aqueous Dispersions
Comparative Polymer Dispersion V1

In a 2 l glass flask fitted with a stirrer and 4 metering devices, 429 g of deionized water and 19.5 g of a 33 wt % aqueous polystyrene seed dispersion (average particle diameter 32 nm) were initially charged at 20 to 25° C. (room temperature) and under nitrogen and heated to 90° C. under agitation. This was followed by the metered addition, commenced at the same time, of feed 1 in the form of an aqueous emulsion over a period of 3.5 hours and feed 2 in the form of an aqueous solution over a period of 4 hours at continuously constant flow rates while maintaining the aforementioned temperature.

| Feed 1: | |
|---|---|
| 16.0 g | of acrylic acid |
| 4.0 g | of allyl methacrylate |
| 622 g | of styrene |
| 142 g | of n-butyl acrylate |
| 45.7 g | of a 35 wt % aqueous solution of N-methylolacrylamide |
| 17.8 g | of a 45 wt % aqueous solution of an alkylarylsulfonic acid mixture (Dowfax ® 2A1) |
| 192 g | of deionized water |

| Feed 2: | |
|---|---|
| 85.0 g | of deionized water |
| 6.4 g | of sodium persulfate |

The polymerization mixture was subsequently allowed to undergo secondary polymerization at 90° C. for 30 minutes and cooled down to room temperature. A pH value of 7.0 was set by addition of 25 wt % aqueous sodium hydroxide solution. The aqueous polymer dispersion obtained had a solids content of 49.4 wt % based on the total weight of the aqueous dispersion. The number average particle diameter was determined as 149 nm.

Solids contents were generally determined by drying a defined amount of the aqueous polymer dispersion (about 0.8 g) using the HR73 moisture determinator from Mettler Toledo at a temperature of 130° C. to constant weight (about 2 hours). Two measurements were carried out in each case. The value reported in each case is the average value of these measurements.

Number average particle diameters for the polymer particles were generally determined by dynamic light scattering on a 0.005 to 0.01 weight percent aqueous polymer dispersion at 23° C. using an Autosizer IIC from Malvern Instruments, England. The reported value is the (cumulant z average) of the measured autocorrelation function (ISO standard 13321).

Comparative Polymer Dispersion V2

The preparation of comparative polymer dispersion V1 was repeated except that feed 1 used 622 g instead of 142 g of n-butyl acrylate and 142 g instead of 622 g of styrene.

The aqueous polymer dispersion obtained had a solids content of 49.4% by weight based on the total weight of the aqueous dispersion. The number average particle diameter was determined as 162 nm.

Comparative Polymer Dispersion V3

The preparation of comparative polymer dispersion V1 was repeated except that feed 1 used 366 g instead of 142 g of n-butyl acrylate, 378 g instead of 622 g of styrene and 24.0 g instead of 4.0 g of allyl methacrylate.

The aqueous polymer dispersion obtained had a solids content of 49.6% by weight based on the total weight of the aqueous dispersion. The number average particle diameter was determined as 129 nm.

Comparative Polymer Dispersion V4

The preparation of comparative polymer dispersion V1 was repeated except that feed 1 used 606 g instead of 622 g of styrene and 32.0 g instead of 16.0 g of acrylic acid.

The aqueous polymer dispersion obtained had a solids content of 49.1% by weight based on the total weight of the aqueous dispersion. The number average particle diameter was determined as 155 nm.

Comparative Polymer Dispersion V5

The preparation of comparative polymer dispersion V1 was repeated except that feed 1 used 133 instead of 142 g of n-butyl acrylate, 583 g instead of 622 g of styrene and additionally 48.0 of acrylonitrile.

The aqueous polymer dispersion obtained had a solids content of 49.8% by weight based on the total weight of the aqueous dispersion. The number average particle diameter was determined as 165 nm.

Inventive Polymer Dispersion K1

The preparation of comparative polymer dispersion V1 was repeated except that feed 1 used 376 g instead of 142 g of n-butyl acrylate and 388 g instead of 622 g of styrene.

The aqueous polymer dispersion obtained had a solids content of 49.6% by weight based on the total weight of the aqueous dispersion. The number average particle diameter was determined as 156 nm.

Inventive Polymer Dispersion K2

In a 6 l stainless steel pressure apparatus fitted with a stirrer and metering devices, 890 g of deionized water, 74.1 g of a 33 wt % aqueous polystyrene seed dispersion (average particle diameter 32 nm) and 145.7 g of a 7 wt % aqueous itaconic acid solution were initially charged at room temperature and under nitrogen and heated to 90° C. under agitation. On reaching the aforementioned temperature 58.3 g of a 7 wt % aqueous sodium persulfate solution were added all at once. This was followed by the metered additions, commenced at the same time, of feed 1 and feed 2, mixed via an inline mixer and added in the form of an aqueous emulsion over a period of 3.5 hours, and feed 3 in the form of an aqueous solution, added over a period of 4 hours, in a continuous manner at constant flow rates while maintaining the aforementioned temperature.

| Feed 1: | |
|---|---|
| 1334 g | of styrene |
| 4.1 g | of tert-dodecyl mercaptan |
| 110 g | of a 35 wt % aqueous solution of N-methylolacrylamide |
| 45.3 g | of a 45 wt % aqueous solution of an alkylarylsulfonic acid mixture (Dowfax ® 2A1) |
| 570 g | of deionized water |
| Feed 2: | |
| 634 g | of 1,4-butadiene |
| Feed 3: | |
| 133 g | of deionized water |
| 10.0 g | of sodium persulfate |

The polymerization mixture was subsequently allowed to undergo secondary polymerization at 90° C. for 30 minutes and cooled down to room temperature and performed a pressure equalization to the ambient pressure (1 atm absolute). A pH value of 7.5 was set by addition of 25 wt % aqueous sodium hydroxide solution. The aqueous polymer dispersion obtained had a solids content of 49.8 wt % based on the total weight of the aqueous dispersion. The number average particle diameter was determined as 125 nm.

Inventive Polymer Dispersion K3

The preparation of comparative polymer dispersion V1 was repeated except that feed 1 used 368 g instead of 142 g of n-butyl acrylate, 380 g instead of 622 g of styrene and 16.0 g of acrylonitrile.

The aqueous polymer dispersion obtained had a solids content of 48.9% by weight based on the total weight of the aqueous dispersion. The number average particle diameter was determined as 155 nm.

Inventive Polymer Dispersion K4

The preparation of comparative polymer dispersion V1 was repeated except that feed 1 used 384 g instead of 142 g of n-butyl acrylate, 396 g instead of 622 g of styrene and 222 g instead of 192 g of deionized water, but omitting the use of 45.7 g of a 35 wt % aqueous solution of N-methylolacrylamide.

The aqueous polymer dispersion obtained had a solids content of 50.3% by weight based on the total weight of the aqueous dispersion. The number average particle diameter was determined as 149 nm.

Inventive Polymer Dispersion K5

In a 2 l glass flask fitted with a stirrer and 4 metering devices, 464 g of deionized water, 29.6 g of a 33 wt % aqueous polystyrene seed dispersion (average particle diameter 32 nm) and 393 g of a 50 wt % aqueous maltodextrin solution (Roclys® C1967S; weight average molecular weight of 26 700 g/mol and also a DE value of 19) were initially charged at room temperature and under nitrogen and heated to 90° C. under agitation. This was followed by the metered addition, commenced at the same time, of feed 1 over a period of 3.5 hours and feed 2 in the form of an aqueous solution over a period of 4 hours, in a continuous manner at constant flow rates while maintaining the aforementioned temperature.

| Feed 1: | |
|---|---|
| 9.7 g | of acrylic acid |
| 3.3 g | of allyl methacrylate |
| 319 g | of styrene |
| 306 g | of n-butyl acrylate |
| 37.2 g | of a 35 wt % aqueous solution of N-methylolacrylamide |
| Feed 2: | |
| 69.1 g | of deionized water |
| 5.2 g | of sodium persulfate |

The polymerization mixture was subsequently allowed to undergo secondary polymerization at 90° C. for 30 minutes and cooled down to room temperature. A pH value of 7.0 was set by addition of 25 wt % aqueous sodium hydroxide solution. The aqueous polymer dispersion obtained had a solids content of 51.9 wt % based on the total weight of the aqueous dispersion. The number average particle diameter was determined as 150 nm.

Inventive Polymer Dispersion K6

In a 2 l glass flask fitted with a stirrer and 4 metering devices, 462 g of deionized water, 29.6 g of a 33 wt % aqueous polystyrene seed dispersion (average particle diameter 32 nm) and 395 g of a 50 wt % aqueous maltodextrin solution (Roclys® C1967S) were initially charged at room temperature and under nitrogen and heated to 90° C. under agitation. This was followed by the metered addition, commenced at the same time, of feed 1 over a period of 3.5 hours and feed 2 in the form of an aqueous solution over a period of 4 hours, in a continuous manner at constant flow rates while maintaining the aforementioned temperature.

| Feed 1: | |
|---|---|
| 9.7 g | of acrylic acid |
| 3.3 g | of allyl methacrylate |
| 195 g | of styrene |
| 442 g | of n-butyl acrylate |
| 24.1 g | of deionized water |
| Feed 2: | |
| 69.1 g | of deionized water |
| 5.2 g | of sodium persulfate |

The polymerization mixture was subsequently allowed to undergo secondary polymerization at 90° C. for 30 minutes and cooled down to room temperature. A pH value of 7.0 was set by addition of 25 wt % aqueous sodium hydroxide solution. The aqueous polymer dispersion obtained had a solids content of 52.9 wt % based on the total weight of the aqueous dispersion. The number average particle diameter was determined as 149 nm.

II Performance Testing

Production of Impregnating Liquors

Impregnating liquors were produced using Emsol® K55 hydroxypropylated potato starch from Emsland Stärke GmbH as a 20 wt % aqueous solution.

The impregnating liquors were produced by the aqueous polymer dispersions K1 to K4 and also the comparative polymer dispersions V1 to V5 being homogeneously mixed with the aqueous solution of Emsol® K55 hydroxylated potato starch such that the weight ratio of the particular solids contents of the aqueous polymer dispersions to the hydroxylated potato starch was 7:3 (corresponding to 42.9 parts by weight of starch per 100 parts by weight of solids of the aqueous polymer dispersions). The homogeneous polymer/starch mixtures thus obtained were subsequently adjusted to a solids content of 15% by weight by diluting with deionized water. The corresponding aqueous dispersions obtained are signified as impregnating liquors FK1 to FK4 and also FV1 to FV5. In addition, aqueous polymer dispersions K1, K4, K5 and K6 without added potato starch were adjusted to a solids content of 15 wt % solely by addition of deionized water. The corresponding aqueous dispersions obtained from the aqueous polymer dispersions K1 and K4 are signified as impregnating liquors FV6 and FV7, while the aqueous dispersions obtained from the aqueous polymer dispersions K5 and K6 are signified as impregnating liquors FK5 and FK6.

Production of Bonded Fiber Webs

Bonded fiber webs were produced using as raw web a needled polyethylene terephthalate spunbonded (40 cm length, 37 cm width) having a density of 125 g/m² from Freudenberg-Politex.

The bonded fiber webs were produced by saturating the raw web with the respective impregnating liquors FK1 to FK6 and also FV1 to FV7 in the longitudinal direction in an HVF impregnating rig with pad-mangle from Mathis (rubber roll Shore A=85°/steel roll). In each case, the wet pick-up was adjusted to 162.5 g of impregnating liquor (corresponding to a solids content of 24.4 g). The impregnated fiber webs obtained were subsequently dried and cured in an LTV laboratory dryer with needle frame from Mathis (in circulating air operation). To this end, the impregnated fiber webs were each placed on an open needle frame, fixed by folding shut and then cured in the laboratory dryer at 200° C. for 3 minutes. The bonded fiber webs obtained in the process are signified as fiber webs FK1 to FK6 and also FV1 to FV7, depending on the impregnating liquors used.

Determination of Breaking Strength in Transverse Direction

Breaking strength in transverse direction was determined for fiber webs FK1 to FK6 and also FV1 to FV7 at room temperature in accordance with DIN 52123 using a breaking machine from Frank (model 71565). In each case, 5 separate measurements were carried out. The measurements in N/50 mm which are reported in table 1 represent the respective averages of these measurements. The higher the measurements obtained, the better the breaking strength in the transverse direction.

Determination of Heat Resistance

The heat resistance of fiber webs FK1 to FK6 and also FV1 to FV7 was determined by extension measurements using a breaking machine from Zwick (model Z10) with integrated heating chamber. To this end, 50×210 mm strips (longitudinal direction) were die-cut out of fiber webs FK1 to FK6 and also FV1 to FV7 in the longitudinal direction and clamped with a length of 100 mm into the pulling device. After introduction to the heating chamber, the test strips were each heated at 180° C. for 60 minutes and thereafter extended at this temperature with increasing tensile force at an extension rate of 150 mm/min. The extension of the test strips in percent was determined on reaching a tensile force of 40 N/50 mm. The lower the extension obtained, the better the heat resistance. In each case, 5 separate measurements were carried out. The values likewise reported in table represent the averages of these measurements.

TABLE 1

Results for breaking strength in transverse direction and
heat resistance of fiber webs FK1 to FK6 and FV1 to FV7

| Fiber web | Transverse breaking strength at room temperature [in N/50 mm] | Extension at 40 N/50 mm and 180° C. [in %] |
|---|---|---|
| FK1 | 312 | 2.7 |
| FK2 | 304 | 2.8 |
| FK3 | 325 | 2.9 |
| FK4 | 304 | 2.8 |
| FK5 | 302 | 2.7 |
| FK6 | 299 | 2.9 |
| FV1 | 254 | 3.3 |
| FV2 | 240 | 3.4 |
| FV3 | 282 | 3.3 |
| FV4 | 231 | 3.4 |
| FV5 | 232 | 3.6 |
| FV6 | 310 | 4.5 |
| FV7 | 301 | 4.2 |

It is clearly apparent from the results that the fiber webs produced with the inventive binder compositions have improved transverse breaking strength at room temperature and/or lower extension at 180° C.

We claim:

1. An aqueous binder composition, comprising
a) at least one polymer P constructed from
   ≥0.1 and ≤2.5 wt % of at least one acid-functional ethylenically unsaturated monomer (monomers A)
   ≥0 and ≤4.0 wt % of at least one ethylenically unsaturated carboxylic acid nitrile or dinitrile (monomers B)
   ≥0.1 and ≤2.0 wt % of at least one crosslinking monomer having two or more nonconjugated ethylenically unsaturated groups (monomers C)
   ≥0 and ≤10 wt % of at least one α,β-monoethylenically unsaturated $C_3$ to $C_6$ mono- or dicarboxamide (monomers D)
   ≥25 and ≤69.9 wt % of at least one ethylenically unsaturated monomer whose homopolymer has a glass transition temperature ≤30° C. and which differs from the monomers A to D (monomers E), and
   ≥30 and ≤70 wt % of at least one ethylenically unsaturated monomer whose homopolymer has a glass transition temperature ≥50° C. and which differs from the monomers A to D (monomers F),
   in polymerized form, wherein the amounts of monomers A to F sum to 100 wt %, and
b) at least one saccharide compound S, the amount of which is determined such that it is ≥10 and ≤400 parts by weight per 100 parts by weight of polymer P,
wherein a total amount of the saccharide compound S is added to an aqueous dispersion of the polymer P on completion of an emulsion polymerization forming the polymer P.

2. The aqueous binder composition according to claim 1, wherein:
the at least one monomer E is selected from the group consisting of a conjugated aliphatic $C_4$ to $C_9$ diene compound, an ester of a vinyl alcohol and a $C_1$ to $C_{10}$ monocarboxylic acid, a $C_1$ to $C_{10}$ alkyl acrylate, a $C_5$ to $C_{10}$ alkyl methacrylate, a $C_5$ to $C_{10}$ cycloalkyl acrylate, a $C_5$ to $C_{10}$ cycloalkyl ethacrylate, a $C_1$ to $C_{10}$ dialkyl maleinate, and a $C_1$ to $C_{10}$ dialkyl fumarate; and
the at least one monomer F is selected from the group consisting of a vinylaromatic monomer and a $C_1$ to $C_4$ alkyl methacrylate.

3. The aqueous binder composition according to claim 1, wherein the polymer P comprises ≥0.1 and ≤1.5 wt % of at least one monomer C in polymerized form.

4. The aqueous binder composition according to claim 1, wherein the polymer P is in the form of an aqueous polymer dispersion.

5. The aqueous binder composition according to claim 4, wherein the polymer particles of the aqueous polymer dispersion have a number average particle diameter ≥50 and ≤400 nm.

6. The aqueous binder composition according to claim 1, wherein the polymer P is constructed from
   ≥0.5 and ≤2.0 wt % of at least one monomer A
   ≥0.1 and ≤1.5 wt % of at least one monomer C
   ≥0 and ≤4.0 wt % of at least one monomer D
   ≥30 and ≤60 wt % of at least one monomer E, and
   ≥40 and ≤70 wt % of at least one monomer F.

7. The aqueous binder composition according to claim 1, wherein the polymer P is constructed from:
   ≥1.0 and ≤2.0 wt % of acrylic acid, methacrylic acid, itaconic acid, or a mixture thereof;
   ≥0.3 and ≤1.2 wt % of 1,4-butylene glycol diacrylate, allyl methacrylate, divinylbenzene, or a mixture thereof;
   ≥0 and ≤4.0 wt % of acrylamide, methacrylamide, N-methylolacrylamide, N-methylolmethacrylamide, or a mixture thereof;
   ≥30 and ≤50 wt % of 2-ethylhexyl acrylate, n-butyl acrylate, 1,4-butadiene, ethyl acrylate, or a mixture thereof; and
   ≥40 and ≤60 wt % of methyl methacrylate, styrene, tert-butyl methacrylate, or a mixture thereof.

8. The aqueous binder composition according to claim 1, wherein the polymer P is constructed from a combination of monomers comprising the monomers A, C, E, F and optionally B and D, such that a polymer consisting of the monomers A, E, F and optionally B and D in polymerized form has a glass transition temperature of ≥5 and ≤35° C.

9. The aqueous binder composition according to claim 1, wherein the at least one saccharide compound S comprises starch, cellulose, guaran, xanthan, alginate, pectin, chitosan, gum arabic, gellan, or a mixture thereof.

10. The aqueous binder composition according to claim 1, wherein the at least one saccharide compound S is a starch, a starch derivative, a substitution product of a starch, a substitution product of a starch derivative, or a mixture thereof.

11. The aqueous binder composition according to claim 1, wherein the saccharide compound S has a weight average molecular weight ≥5000 and ≤25 000 g/mol.

12. The aqueous binder composition according to claim 1, comprising ≥10 and ≤70 parts by weight of the S saccharide compound S per 100 parts by weight of the polymer P.

13. The aqueous binder composition according to claim 1, further comprising ≤1 wt % of a polyol compound having a molecular weight of ≤200 g/mol with two or more hydroxyl groups, based on the summed overall amounts of the polymer P and the saccharide compound S.

14. The aqueous binder composition according to claim 1, wherein the polymer P comprises ≥0.5 and ≤4.0 wt % of the monomer B in polymerized form.

15. The aqueous binder composition according to claim 1, wherein the polymer P comprises:
   ≥0.1 and ≤2.0 wt % of the monomer C in polymerized form; and
   ≥0.1 and ≤10 wt % of the monomer D in polymerized form.

* * * * *